Nov. 23, 1965 T. J. RHODES ETAL 3,218,809
APPARATUS AND METHOD FOR ATTENUATING WAVES
Filed Feb. 14, 1961 3 Sheets-Sheet 2
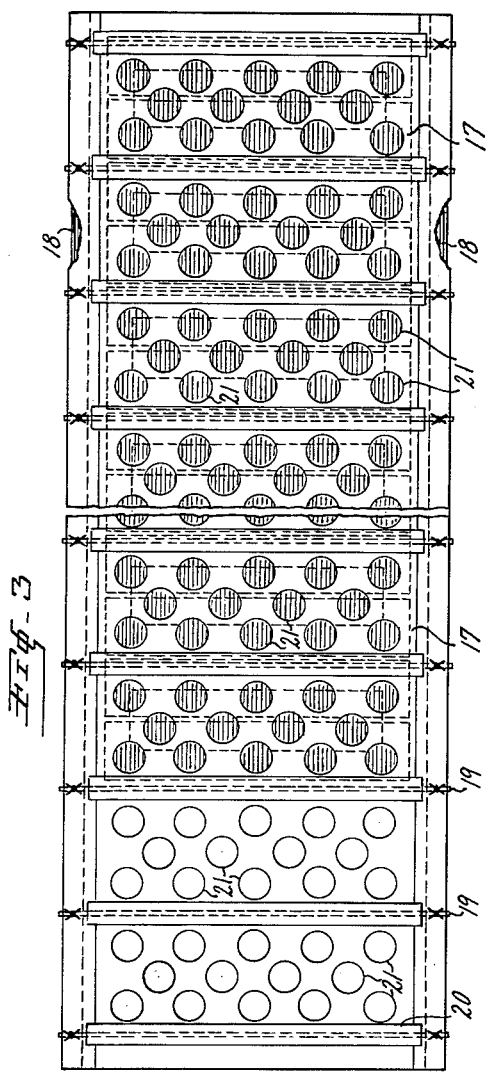
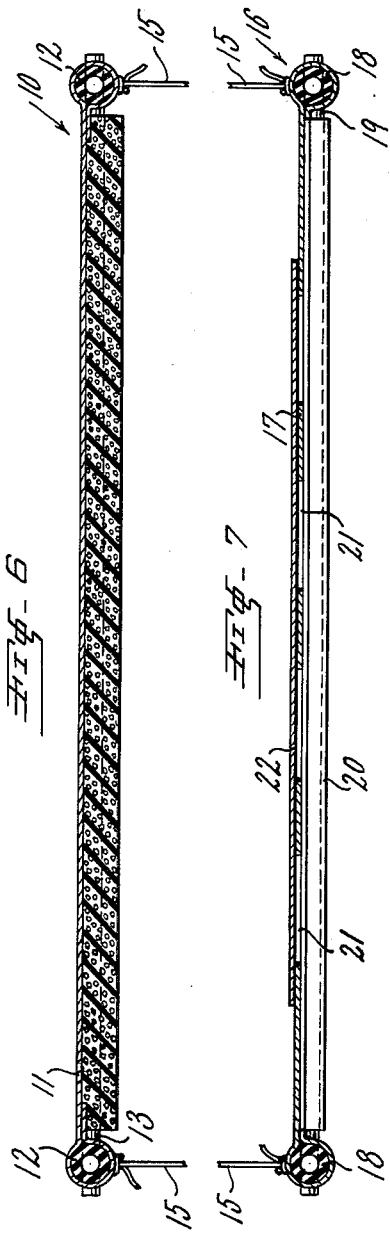
INVENTORS
THOMAS J. RHODES
HENRY F. MILLER
BY David B. Miller
ATTORNEY United States Patent Office 3,218,809
Patented Nov. 23, 1965

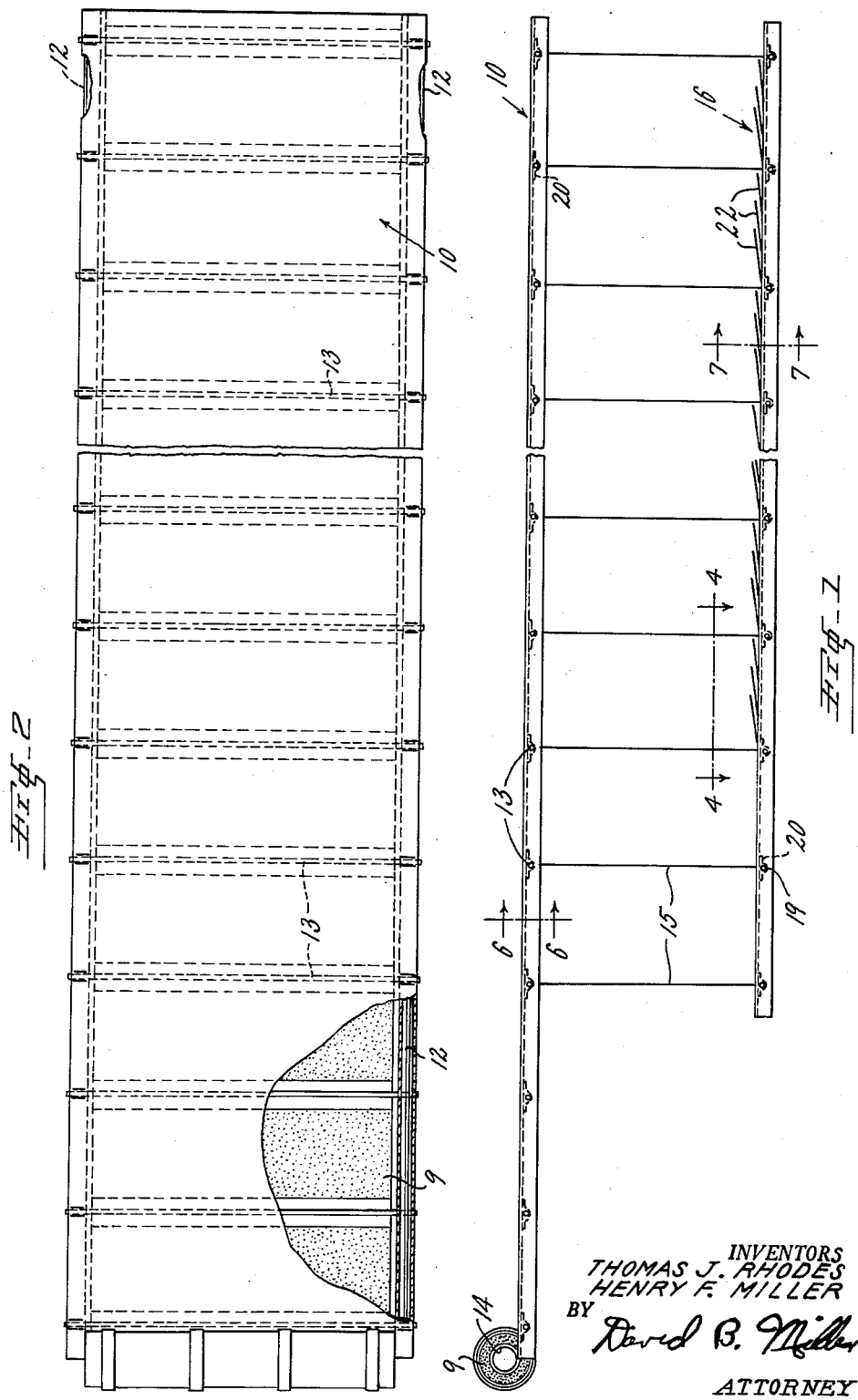

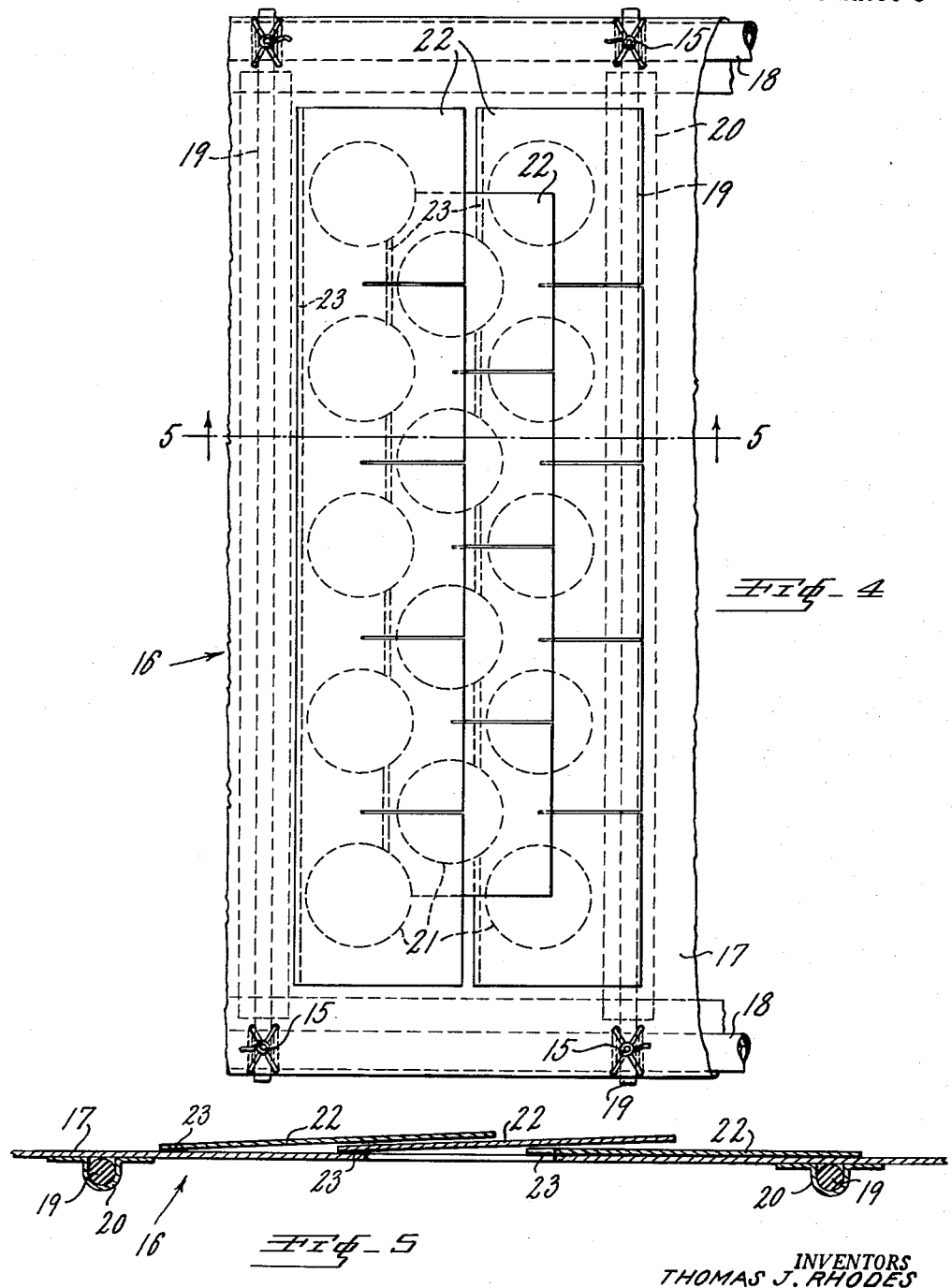

3,218,809
APPARATUS AND METHOD FOR
ATTENUATING WAVES
Thomas J. Rhodes, Smoke Rise, Kinnelon Borough, and Henry F. Miller, Clifton, N.J., assignors to United States Rubber Company, New York, N.Y., a corporation of New Jersey
Filed Feb. 14, 1961, Ser. No. 89,174
21 Claims. (Cl. 61—5)

This invention relates to a device useful for attenuating waves in liquids, such as the waves which occur in oceans, lakes and other large bodies of water. It also relates to a method of attenuating such waves.

Man has been interested in stilling ocean waves for generations. Today the desire to protect beaches against erosion by waves, the desire to protect man-made structures such as Texas towers against wave damage, and the need for means to create artificial harbors increase the need for devices to calm waves.

The device of this invention is able to attenuate waves in large bodies of water. It comprises a float means which is buoyant in the liquid in which the wave is propagated. This float preferably includes an imperforate sheet which is floated on or near the surface of the wave and prevents the wave from passing over the sheet. Hanger means, such as a series of flexible cords fixed at one end to the float, depend from the float and carry a brake means spaced beneath the imperforate sheet. The brake preferably includes a perforated valve sheet carried at the bottom of the hanger cords, and the brake is weighted so it can sink readily through the liquid. The valve sheet is provided with a series of flapper valve strips that close the perforations when the valve sheet is pulled up by the hanger cords under the action of the float. Consequently the brake resists rising through the liquid when it is pulled upward.

The method of attenuating the waves according to this invention comprises placing the float in the liquid in which the waves are being propagated, with the brake suspended beneath the float. The float is allowed to fall into the trough of the waves which are to be attenuated, and at the same time the brake is allowed to sink deeper in the liquid following the wave motion. As the crest of the advancing wave passes under the float it lifts the float, but the brake resists this rising movement, and the motion of the wave is partially damped. The water on the "down-stream" side of the device, i.e. the side opposite that which is reached first by the oncoming wave, is thereby rendered less turbulent than the water on the "upstream" side. After the crest has passed a particular point of the device the weight of the brake enables it to follow the trough. Thus the brake is forced to follow the wave motion, offering resistance to the wave motion during its upward travel and no resistance during its downward travel, thereby effecting a damping action on the wave.

The device of this invention may also be used to transfer wave energy from the high energy band near the surface of the liquid to a low energy zone spaced a substantial distance beneath the surface. In this way the wave energy may be put to useful work, as for example to move sand or other matter on the bottom, and this invention contemplates a method of transferring wave energy to a low energy zone beneath the surface of the liquid.

To move sand by this latter method a device of the type described is positioned near the water line of the shore with the brake arranged so it will ride at or near the bottom. The rising and falling of the brake under the wave action transfers energy, which originated at the liquid surface, to the liquid in the lower zone near the bottom and creates a turbulence in the liquid in this lower zone which lifts particles of matter from the bottom and suspends them temporarily in the water, so the transferred energy, or the energy of the wave if the water be so shallow that the wave disturbance extends to the bottom, may move them in a manner akin to that described in "Beaches" by W. Bascom, Scientific American, volume 203, page 81 (August 1960).

For a better understanding of the nature of this invention, reference should be had to the following detailed description of specific embodiments thereof when read in conjunction with the accompanying drawings, wherein:

*The drawings*

FIG. 1 is a side elevation of the device of this invention;
FIG. 2 is a top plan view of the float shown in FIG. 1;
FIG. 3 is a view of the brake looking upwardly in FIG. 1;
FIG. 4 is a view along the line 4—4 of FIG. 1;
FIG. 5 is a cross-section view along the line 5—5 of FIG. 4;
FIG. 6 is a cross-section view along the line 6—6 of FIG. 1; and
FIG. 7 is a cross-sectional view along the line 7—7 of FIG. 1.

*Detailed description*

The embodiment illustrated in the drawings includes a float 10 which is buoyant in the liquid in which the waves are being propagated. Preferably this float includes as the buoyant element an imperforate, unicellular, e.g. closed cell, expanded elastomer sheet 9 with a specific gravity less than one. An imperforate sheet of this type can function in the dual capacity as the float and as the top sheet of the device, but, if desired, a nonbuoyant sheet supplied with external floats could be used. As shown in FIG. 6, a cover sheet 11 of coated fabric is cemented to the top of the unicellular sheet 9. Each side of the cover sheet is wrapped around a rubber hose 12 and cemented to itself to form a pocket along each side of the unicellular sheet through which the hose 12 extends. Rigid rods 13 extend transversely of the float 10. As appears in FIGS. 1 and 2, these rods extend from side to side of the unicellular sheet, and a plurality of the rods 13 are spaced uniformly from each other along the length of the float 10. Pouches are formed around the rods 13 by covering them with rectangular sheets of the same material that forms the cover sheet 11 and by cementing these rectangular sheets to the cover sheet 11. At the leading edge of the device a large rigid tube 14 extends across the width of float 10, and the leading edge of float 10 is wrapped around this tube 14 (see FIG. 1).

Depending from float 10 are hanger cords 15 which are tied to the rods 13 and hoses 12, one at each end of each rod. The hanger cords 15 carry a brake 16 which is designed to sink readily through the liquid, but to resist rising through the liquid when pulled upwardly by the hanger cords 15.

As appears in FIGS. 3, 4 and 5 the brake 16 includes a perforated valve sheet 17 of substantially the same width as, but somewhat shorter than, the float 10. The perforated valve sheet 17 in the embodiment shown is made up of a single sheet of coated fabric of the desired length. As appears in FIG. 7, at each side of the brake 16 the perforated valve sheet is folded over and cemented to itself to form a pocket which encloses rubber hoses 18 that extend along the sides of the valve sheet throughout its length. Uniformity spaced apart along the length of the brake 16 are weighting rods 19 which cause the brake to sink readily through the liquid. These rods 19 are held to the perforated valve sheet 17 by placing rectangular strips of coated fabric 20 over them and cementing these strips to the perforated valve sheet 17 to enclose the rods 19 in a pocket (see FIG. 5) similar to the pockets enclosing the rods 13. The hanger cords 15 are tied to hoses 18 and to the ends of the weighting rods 19.

As best appears in FIGS. 4 and 5, the perforated valve sheet 17 is made from a material impervious to water, but it has a multiplicity of holes 21 therethrough. Flapper valve strips 22 are provided which are arranged to overlie, at least partially, the holes 21. In the embodiment shown these flapper strips 22 are narrow rectangular strips of coated fabric long enough to extend across the perforated area and from one side of sheet 17 to the other, and they are of a width such that they may completely cover the openings 21. Each flapper strip 22 is cemented along its forward edge, as at 23, to the perforated valve sheet 17 while the sides and the other edge of each flapper strip 22 are free. Since the flapper strips 22 are thin flexible sheets of coated fabric, they will hinge and bend away from the perforated valve sheet 17 when any force is exerted on them from below, as by liquid passing through the holes 21 from the bottom of the valve sheet to the top as seen in FIG. 5. But when the valve sheet is lifted (moved up as seen in FIG. 5) the liquid will force the flapper strips 22 flat against the perforated sheet 17, so strips 22 will be disposed as appears in FIG. 5, and consequently they will close the holes 21.

In place of a brake of the type shown in FIGS. 4 and 5, a metal grid of the type used to reinforce concrete may form the perforated valve sheet. Flapper strips would be fixed to this grid at spaced intervals along its length and would be arranged to close the openings through the grid in the same way that flapper strips 22 close the holes 21 through the perforated sheet 17. If desired such a concrete reinforcing metal grid may also be used as the load bearing member of float 10 in place of rods 13 and hoses 12 when a suitable buoyant element is secured to the grid.

*Operation*

To calm water waves the device heretofore described is placed in the body of water in which the waves are being propagated, with the brake 16 suspended beneath the surface of the water on the cords 15 and with the float 10 floating at the surface. The device is moored in position with the righthand edge of the device as seen in FIG. 1 immediately adjacent the area where calm water is desired. As the wave approaches the opposite end, i.e., that with the rigid tube 14, that end of the device falls into the trough of the oncoming wave. Since float 10 floats on the surface of the water, the wave enters under the float 10.

As the trough of a wave reaches the water above the left end of the brake 16, that part of float 10 above this end of the brake falls into the trough, and the left end of brake 16 sinks through the water to follow the trough. The brake sinks quickly because the water passes freely through holes 21. As the crest of a wave approaches this point, the buoyancy of float 10 causes it to be lifted vertically on the rising water. Of course, since float 10 includes imperforate sheets 9 and 11, the water is physically trapped beneath it, and as the water rises it lifts float 10. This additional lifting force would also be present, although to a lesser degree, if the float 10 had a number of small perforations therethrough which would permit passage of the water from one side to the other of float 10.

But as the cords 15 lift the brake 16, the flapper strips 22 cover the holes 21 and thereby retard the upward movement of brake 16. As the wave passes through the device the water rises at immediately succeeding points along the length of the device. This sustained action dissipates the energy of the wave and attenuates it.

When the device is moored in relatively shallow water so that the brake 16 rises and falls in a zone near the bottom, it is observed that particles of matter are lifted from the bottom by the rising and falling action of the valve sheet 17 and are suspended temporarily in the turbulent water in his zone. Consequently the device may be moored in shallow water with the valve sheet 17 positioned near the bottom, and the waves passing through the device will cause matter to be lifted from the bottom and to be transported through the water in the direction of travel of the oncoming wave.

*Working examples*

The following specific examples are given.

In the preferred embodiment the float 10 includes as the unicellular sheet a sheet of the unicellular expanded plasticized ruber sold under the trademark "Ensolite" and having a density of 1.15 grams per cubic inch. The cover sheet is a vinyl resin coated fabric weighing 5 ounces per square yard of the type made from 210 denier nylon yarns as disclosed in United States Letters Patent No. 2,619,705 granted December 2, 1952 to Foster. The rods 13 and 19 are stainless steel rods, and the tube 14 is an aluminum tube.

The hanger cords 15 are braided from polypropylene yarns.

The perforated valve sheet 17 is the same vinyl coated nylon fabric that is used for the cover sheet 11. The holes 21 are arranged with a row of five holes alternating with a row of four as appears in FIG. 4. The flapper strips 22 are cemented to the perforated valve sheet 17, and as appears in FIG. 4 they are partially cut through from their right-hand edge on each side of each hole to increase the flexibility of the flapper strips. The flapper strips are vinyl coated nylon fabric of the type made from 840 denier yarns disclosed in the above-mentioned Foster patent, and the coated fabric weighs 9 ounces per square yard.

There is a short distance from the center of tube 14 to the first pair of hanger cords 15, and a short length of perforated sheet 17 is not provided with flapper strips. This little distance at the leading edge of the device where no brake is found beneath the float followed by a second short section where the valve sheet has no flapper strips, aids performance of the device by minimizing the chance a wave will pass over, rather than under, the device.

A second embodiment of the same general construction as the preferred embodiment and consisting of six units each approximately 39 inches deep and 20 feet long was tested in a water depth of 4½ feet.

It was found using this second embodiment that (a) approximately 30% of the wave height was attenuated when the ratio of wave length to the length of the valve sheet containing flapper strips was approximately 1.5, (b) approximately 60% of the wave height was attenuated when the ratio was 1.0 and (c) about 95% of the wave height was attenuated when the ratio was approximately 0.5. Thus with a valve sheet approximately two-thirds the length of the wave to be attenuated, approximately 30% of the wave height was attenuated, with a valve sheet approximately equal the length of the waves to be attenuated, approximately 60% of the wave height was attenuated, and with a valve sheet approximately twice the length of the waves to be attenuated, approximately 95% of the wave height was attenuated. The valve sheet may be three or more times the length of the wave to be attenuated. Desirably the valve sheet is suspended a distance beneath the impervious sheet equal to at least .1 times the trough to crest height of the waves to be attenuated.

Having thus described our invention, what we claim and desire to protect by Letters Patent is:

1. A device for transferring wave energy in a liquid from the high energy band adjacent to the surface of the liquid to a low energy zone spaced a substantial distance beneath the surface, which comprises, means buoyant in a liquid, said buoyant means including an elongated flexible impervious substantially flat sheet whose length is at least two-thirds the length of the waves, hanger means depending from said sheet, perforate brake means carried by said hanger means, said brake means being constructed and arranged to pass readily through the liquid as it falls but to resist moving through the liquid when it rises, whereby said brake means may sink readily through the liquid but resist rising through said liquid as it is pulled up by said hanger means under the action of said buoyant means, said brake means being spaced below said impervious sheet a distance at least .1 the trough to crest height of the waves.

2. A device for transferring wave energy in a liquid from the high energy band adjacent to the surface of the liquid to a low energy zone spaced a substantial distance beneath the surface, which comprises, means buoyant in a liquid, said buoyant means including a flexible impervious substantially flat sheet whose length is at least two-thirds the length of the waves, a multiplicity of spaced cord-like hanger means spaced from each other and each depending from said sheet, a valve sheet substantially as wide as said impervious sheet carried by said hanger means weighted to sink readily through the liquid, said valve sheet having a multiplicity of holes therethrough through which the liquid may pass as the valve sheet sinks, means connected to said device adapted to restrict the passage of liquid through the holes in the valve sheet as it rises toward the buoyant means and to permit the liquid to flow readily through the valve sheet as it sinks in the liquid, said valve sheet being spaced beneath said impervious sheet a distance at least .1 the trough to crest height of the waves, 3. Apparatus according to claim 2 in which said valve sheet is a stiff reticular means.

4. Apparatus according to claim 2 in which said restricting means includes thin flexible flapper strips each fixed along one of its edges to the top of said valve sheet and adapted to overlie holes therethrough when arranged flat against the valve sheet, whereby the flapper strip may be bent away from the holes by the liquid as the valve sheet sinks therethrough and the flapper strip may be disposed flat against the valve sheet when pressed thereagainst by the liquid as the valve sheet is pulled up.

5. Apparatus according to claim 2 in which said impervious sheet is a sheet of unicellular elastomer and in which said valve sheet is a coated fabric.

6. Apparatus according to claim 4 in which said impervious sheet is longer than said valve sheet, and one end of said valve sheet hangs from an area of said impervious sheet spaced a substantial distance from an end of said impervious sheet, whereby an oncoming wave may enter under said end of the impervious sheet and pass thereunder a substantial distance before reaching said valve sheet.

7. Apparatus according to claim 6 including a first portion of said valve sheet containing holes therethrough through which liquid may pass freely during both the rise and fall of that portion of said valve sheet, said first portion of the valve sheet being at the end of said valve sheet nearest said spaced end of said impervious sheet.

8. A method of attenuating waves which comprises floating an elongated, flexible, substantially flat impervious sheet in the liquid in which the waves are formed, said sheet having a length at least two-thirds the length of the waves, allowing the wave to enter under the sheet, the impervious sheet preventing water from passing through the sheet, allowing the sheet to move downwardly relatively freely as it passes to the trough of the wave but retarding the rising movement of the sheet over the crest of the wave.

9. A method of attenuating waves which comprises floating an impervious sheet in the liquid in which the waves are formed, said sheet having a length at least two-thirds the length of the waves, suspending at least .1 the trough to crest height of the waves beneath the impervious sheet a weighted brake sheet which is connected to said impervious sheet, said weighted brake sheet being equal in length at least to approximately two-thirds the length of the waves to be attenuated, allowing the wave to enter under the impervious sheet, and retarding the rising movement of the brake sheet and thereby of the impervious sheet connected thereto as the liquid rises under the impervious sheet with the advancing wave.

10. A method of attenuating waves which comprises floating an elongated, flexible, substantially flat impervious sheet in the liquid in which the waves are formed, said sheet having a length at least two-thirds the length of the waves, suspending a weighted valve sheet of substantially the same width as said impervious sheet from said impervious sheet, allowing the wave to enter under the leading end of the impervious sheet, allowing the sheet to move downwardly relatively freely as it passes to the trough of the wave but retarding the rising movement of the valve sheet and thereby of the impervious sheet connected thereto as the liquid rises under the impervious sheet with the advancing wave.

11. The method in accordance with claim 10 in which said valve sheet has a multiplicity of holes therethrough, and including the steps of allowing the liquid to pass through the holes in the valve sheet readily as the valve sheet falls through the liquid, and covering at least partially the holes in the valve sheet as the valve sheet rises through the liquid to retard the rising movement of the valve sheet.

12. A method in accordance with claim 10 in which the length of the valve sheet equals at least the length of the waves to be attenuated.

13. The method in accordance with claim 12 in which the length of the valve sheet equals at least three times the length of the waves to be attenuated.

14. The method in accordance with claim 12 in which the weighted valve sheet is suspended a distance beneath the impervious sheet equal to at least .1 the trough to crest height of the waves to be attenuated.

15. The method in accordance with claim 12 in which the length of the valve sheet equals at least twice the length of the waves to be attenuated.

16. The method of causing matter on the bottom of a body of liquid having waves therein to be lifted from the bottom and temporarily suspended in the liquid which comprises, floating an impervious sheet in the liquid in which the waves are formed, suspending near the bottom of the liquid a weighted valve sheet having a multiplicity of holes therethrough from said impervious sheet, allowing the wave to enter under the leading end of the impervious sheet, allowing the liquid to pass through the holes in the valve sheet readily as the valve sheet falls through the liquid, and retarding the rising movement of the valve sheet and thereby of the impervious sheet connected thereto as the liquid rises under the impervious sheet with advancing wave, whereby the valve sheet is caused to rise and fall in a zone near the bottom.

17. The method of moving particles of matter on the bottom of a liquid with energy from waves in the liquid which comprises, positioning a float in the high energy band adjacent the surface of the liquid to rise and fall with the waves, suspending a multiplicity of spaced energy-transmitting cord-like members on the float to pass downwardly through the liquid at least a major part of that depth of the liquid where wave energy is found, fixing to the bottom of the energy-transmitting members a weighted member presenting a relatively small effective leading surface area to the liquid as it falls and a relatively large leading surface area to the liquid as it rises, said weighted member including a sheet having a multiplicity of holes therethrough distributed over its surface through which the liquid may pass as the weighted member sinks and flap closures for said holes each pivoted on a side of its hole generally facing the oncoming wave, said weighted member being suspended sufficiently near the bottom that the energy generated by it is transmitted by the liquid therebeneath to be felt by matter on the bottom.

18. The method of moving particles of matter on the bottom of a body of liquid near the edge thereof with energy from waves in the liquid which comprises, positioning a float including an elongated, impervious, substantially flat sheet in the high energy band adjacent the surface of the liquid to rise and fall with the waves, suspending energy-transmitting members including a multiplicity of spaced cord-like hangers from the sheet to pass downwardly through the liquid a substantial distance, fixing to the energy-transmitting members a brake member substantially as wide as said sheet and adapted to fall readily through the liquid when the float falls towards the trough of a wave but to resist rising through the liquid when the float rises towards the crest of a wave, said brake member having a multiplicity of holes therethrough distributed over its surface through which the liquid may pass as the brake member sinks and flap closures for said holes each pivoted on a side of its hole generally opposite the shore edge of the body of liquid, siad brake member being adapted to fall readily through the liquid and being suspended sufficiently near the botom that the energy generated by it is transmitted by the liquid therebeneath to be felt by matter on the bottom.

19. A method in accordance with claim 18 in which the length of the brake member equals at least two-thirds the length of the waves to which the float is subjected.

20. A method in accordance with claim 18 in which the length of the brake member equals at least the length of the waves to which the float is subjected.

21. A method in accordance with claim 18 in which the length of the brake member equals at least three times the lentgh of the waves to which the float is subjected.

References Cited by the Examiner
UNITED STATES PATENTS

| | | | |
|---|---|---|---|
| 1,096,192 | 5/1914 | Pleva | 114—126 X |
| 1,107,652 | 8/1914 | Burton | 9—11 |
| 1,432,530 | 10/1922 | Chance | 61—5 |
| 3,029,606 | 4/1962 | Olsen | 61—5 |

FOREIGN PATENTS

| | | |
|---|---|---|
| 5,242 | 3/1884 | Great Britain. |

OTHER REFERENCES

Engineering News-Record of Oct. 11, 1945, page 8.

CHARLES E. O'CONNELL, *Primary Examiner.*

WILLIAM I. MUSHAKE, JACOB L. NACKENOFF, EARL J. WITMER, *Examiners.*